(12) United States Patent
Kwon et al.

(10) Patent No.: US 9,945,451 B2
(45) Date of Patent: Apr. 17, 2018

(54) PLANETARY GEAR TRAIN OF AUTOMATIC TRANSMISSION FOR VEHICLE

(71) Applicant: Hyundai Motor Company, Seoul (KR)

(72) Inventors: Hyun Sik Kwon, Seoul (KR); Seong Wook Hwang, Gunpo-si (KR); Wonmin Cho, Hwaseong-si (KR); Jae Chang Kook, Hwaseong-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 15/194,830

(22) Filed: Jun. 28, 2016

(65) Prior Publication Data

US 2017/0152918 A1 Jun. 1, 2017

(30) Foreign Application Priority Data

Dec. 1, 2015 (KR) .................. 10-2015-0170228

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/006* (2013.01); *F16H 2200/201* (2013.01); *F16H 2200/2046* (2013.01); *F16H 2200/2097* (2013.01)

(58) Field of Classification Search
CPC .............. F16H 3/66; F16H 2200/006; F16H 2200/201; F16H 2200/2046; F16H 2200/2097
See application file for complete search history.

(56) References Cited

U.S. PATENT DOCUMENTS

| 6,743,145 B2 * | 6/2004 | Usoro | F16H 3/66 475/286 |
| 6,746,360 B2 * | 6/2004 | Bucknor | F16H 3/66 475/275 |

(Continued)

FOREIGN PATENT DOCUMENTS

| JP | 2011-033098 A | 2/2011 |
| JP | 4755703 B2 | 8/2011 |

(Continued)

*Primary Examiner* — Ramya P Burgess
*Assistant Examiner* — David R Morris
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set, a second planetary gear set, a third planetary gear set, a first rotation shaft selectively connectable to the input shaft, a second rotation shaft, a third rotation shaft selectively connectable to at least one of the input shaft and a transmission housing, a fourth rotation shaft selectively connectable to the first rotation shaft, a fifth rotation shaft directly connected to the transmission housing, a sixth rotation shaft selectively connectable to the fourth rotation shaft, and directly connected to the output shaft, and a seventh rotation shaft selectively connectable to the first rotation shaft.

8 Claims, 2 Drawing Sheets

(56) References Cited

U.S. PATENT DOCUMENTS

| | | | |
|---|---|---|---|
| 7,104,914 B2* | 9/2006 | Bucknor | F16H 3/66 475/276 |
| 7,736,259 B2* | 6/2010 | Wittkopp | F16H 3/66 475/275 |
| 9,625,009 B2* | 4/2017 | Kwon | F16H 3/66 |
| 2004/0053732 A1* | 3/2004 | Usoro | F16H 3/66 475/275 |
| 2004/0053733 A1* | 3/2004 | Bucknor | F16H 3/66 475/276 |
| 2008/0242473 A1* | 10/2008 | Wittkopp | F16H 3/66 475/275 |
| 2017/0074359 A1* | 3/2017 | Kwon | F16H 3/66 |
| 2017/0074364 A1* | 3/2017 | Kwon | F16H 3/66 |
| 2017/0108086 A1* | 4/2017 | Kwon | F16H 3/66 |

FOREIGN PATENT DOCUMENTS

| | | |
|---|---|---|
| JP | 2015-055264 A | 3/2015 |
| KR | 10-2012-0121158 A | 11/2012 |

* cited by examiner

FIG. 2

| Speed stages | C1 | C2 | C3 | C4 | C5 | B1 | Gear ratio |
|---|---|---|---|---|---|---|---|
| D1 | ● | | | | ● | ● | 4.235 |
| D2 | ● | | ● | | ● | | 1.548 |
| D3 | ● | | | ● | ● | | 1.470 |
| D4 | ● | ● | | | ● | | 1.000 |
| D5 | | ● | | ● | ● | | 0.855 |
| D6 | | ● | ● | | ● | | 0.831 |
| D7 | | ● | ● | ● | | | 0.581 |
| D8 | ● | ● | ● | | | | 0.233 |
| REV | ● | | ● | | | ● | -0.279 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0170228, filed Dec. 1, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving eight forward speed stages with a minimum number of constituent elements being used.

Description of Related Art

Recent increases in oil prices are triggering competition among auto-makers in enhancing fuel consumption of a vehicle.

In this sense, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

However, in the case of the automatic transmission, the number of internal components increases as the number of gear shift stages is increased, which may deteriorate installability, production cost, weight and/or power flow efficiency.

Accordingly, development of a planetary gear train which may achieve maximum efficiency with a small number of components is important in order to increase fuel economy enhancement effect through the multiple-speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving eight forward speed stages and one reverse speed stage.

Various aspects of the present invention are additionally directed to providing a planetary gear train of an automatic transmission for a vehicle having further advantages of improving silent driving of the vehicle by using operation point positioned at a low rotational speed region of an engine.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a first rotation shaft directly connected to the first rotation element and selectively connectable to the input shaft, a second rotation shaft directly connecting the second rotation element with the fifth rotation element and the seventh rotation element, a third rotation shaft directly connected to the third rotation element and selectively connectable to at least one of the input shaft and a transmission housing, a fourth rotation shaft directly connected to the fourth rotation element and selectively connectable to the first rotation shaft, a fifth rotation shaft directly connected to the sixth rotation element and directly connected to the transmission housing, a sixth rotation shaft directly connected to the eighth rotation element, selectively connectable to the fourth rotation shaft, and directly connected to the output shaft, and a seventh rotation shaft directly connected to the ninth rotation element and selectively connectable to the first rotation shaft.

The first planetary gear set may be a single pinion planetary gear set, the first rotation element may be a first sun gear, the second rotation element may be a first planet carrier, and the third rotation element may be a first ring gear, the second planetary gear set may be a single pinion planetary gear set, the fourth rotation element may be a second sun gear, the fifth rotation element may be a second planet carrier, and the sixth rotation element may be a second ring gear, and the third planetary gear set may be a single pinion planetary gear set, the seventh rotation element may be a third sun gear, the eighth rotation element may be a third planet carrier, and the ninth rotation element may be a third ring gear.

The planetary gear train may further include a first clutch selectively connecting the input shaft with the first rotation shaft, a second clutch selectively connecting the input shaft with the third rotation shaft, a third clutch selectively connecting the fourth rotation shaft with the sixth rotation shaft, a fourth clutch selectively connecting the first rotation shaft with the fourth rotation shaft, a fifth clutch selectively connecting the first rotation shaft with the seventh rotation shaft, and a first brake selectively connecting the third rotation shaft with the transmission housing.

A first forward speed stage may be achieved by operation of the first and fifth clutches and the first brake, a second forward speed stage may be achieved by operation of the first, third, and fifth clutches, a third forward speed stage may be achieved by operation of the first, fourth, and fifth clutches, a fourth forward speed stage may be achieved by operation of the first, second, and fifth clutches, a fifth forward speed stage may be achieved by operation of the second, fourth, and fifth clutches, a sixth forward speed stage may be achieved by operation of the second, third, and fifth clutches, a seventh forward speed stage may be achieved by operation of the second, third, and fourth clutches, an eighth forward speed stage may be achieved by operation of the first, second, and third clutches, and a reverse speed stage may be achieved by operation of the first and third clutches and the first brake.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a first rotation shaft directly connected to the first rotation element and selectively connectable to the input shaft, a second rotation shaft directly connecting the second rotation element with the fifth rotation element and the seventh rotation element, a third rotation shaft directly connected to the third rotation element and selectively connectable to at least one of the input shaft and a transmission housing, a fourth rotation shaft directly connected to the fourth rotation element and selectively connectable to the first rotation shaft, a fifth rotation shaft directly connected to the sixth rotation element and directly connected to the transmission housing, a sixth rotation shaft directly connected to the eighth rotation element, selectively connectable to the fourth rotation shaft, and directly connected to the output shaft, and a seventh rotation shaft directly connected to the ninth rotation element and selectively connectable to the first rotation shaft, a first clutch selectively connecting the input shaft with the first rotation shaft, a second clutch selectively connecting the input shaft with the third rotation shaft, a third clutch selectively connecting the fourth rotation shaft with the sixth rotation shaft, a fourth clutch selectively connecting the first rotation shaft with the fourth rotation shaft, a fifth clutch selectively connecting the first rotation shaft with the seventh rotation shaft, and a first brake selectively connecting the third rotation shaft with the transmission housing.

According to various aspects of the present invention, a planetary gear train of an automatic transmission for a vehicle may include an input shaft receiving torque of an engine, an output shaft outputting changed torque, a first planetary gear set which may be a single pinion planetary gear set and include a first sun gear, a first planet carrier, and a first ring gear as rotation elements thereof, a second planetary gear set which may be a single pinion planetary gear set and include a second sun gear, a second planet carrier, and a second ring gear as rotation elements thereof, and a third planetary gear set which may be a single pinion planetary gear set and include a third sun gear, a third planet carrier, and a third ring gear as rotation elements thereof, in which a first rotation element may be selectively connectable to at least one of the input shaft, a fourth rotation element and a ninth rotation element, a second rotation element may be directly connected to a fifth rotation element and a seventh rotation element, a third rotation element may be selectively connectable to at least one of the input shaft and a transmission housing, the fourth rotation element may be selectively connectable to an eighth rotation element, a sixth rotation element may be directly connected to the transmission housing, and the eighth rotation element may be directly connected to the output shaft.

The planetary gear train may further include a first clutch selectively connecting the input shaft with the first rotation element, a second clutch selectively connecting the input shaft with the third rotation element, a third clutch selectively connecting the fourth rotation element with the eighth rotation element, a fourth clutch selectively connecting the first rotation element with the fourth rotation element, a fifth clutch selectively connecting the first rotation element with the ninth rotation element, and a first brake selectively connecting the third rotation element with the transmission housing.

The planetary gear train according to various embodiments of the present invention may achieve eight forward speed stages and one reverse speed stage by combining three planetary gear sets being simple planetary gear sets with six control elements.

In addition, the planetary gear train according to various embodiments of the present invention may improve silent driving because speed stages suitable to a rotational speed of the engine are achieved due to multiple-speed stages of the automatic transmission.

In addition, the planetary gear train according to various embodiments of the present invention maximizes driving efficiency of the engine and improves power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to various embodiments of the present invention.

Figure 1:
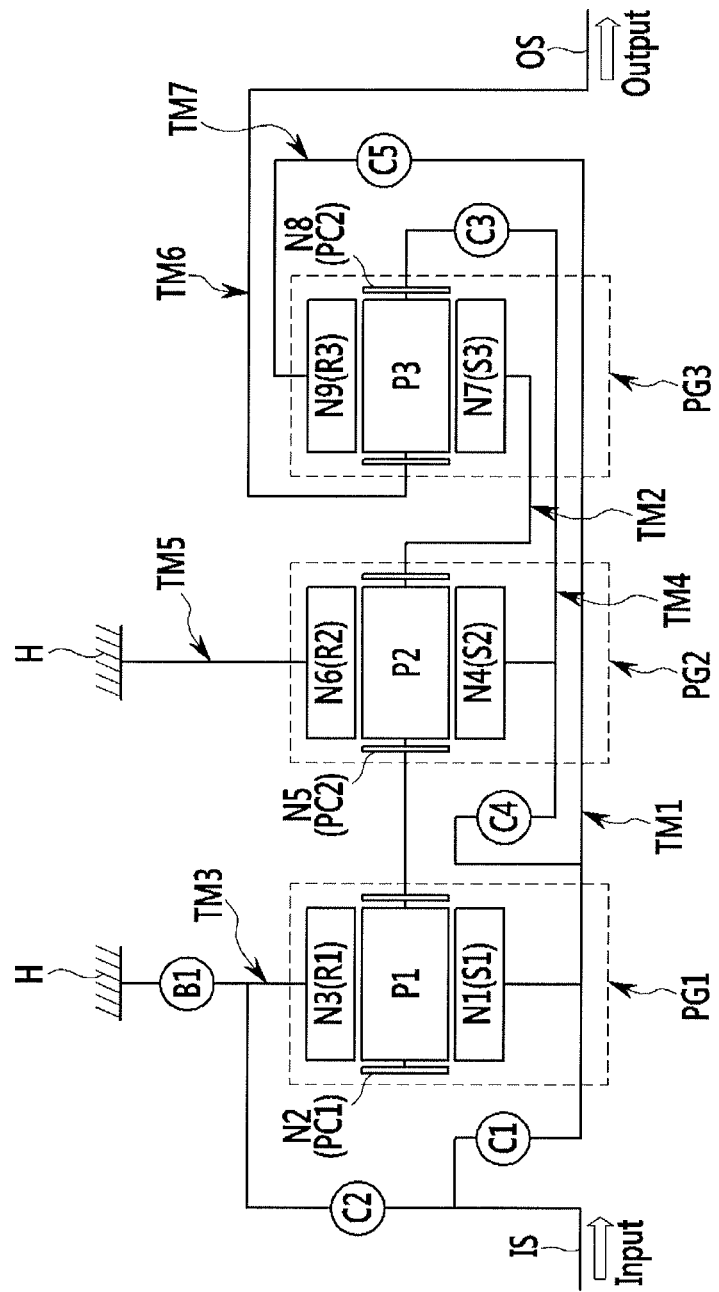
FIG. 1 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, and third planetary gear sets PG1, PG2, and PG3 disposed on the same axis, an input shaft IS, an output shaft OS, seven rotation shafts TM1 to TM7 connected to at least one of rotation elements of the first, second, and third planetary gear sets PG1, PG2, and PG3, six control elements C1 to C5 and B1, and a transmission housing H.

Torque input from the input shaft IS is changed by cooperation of the first, second, and third planetary gear sets PG1, PG2, and PG3 and the changed torque is output through the output shaft OS.

The planetary gear sets are disposed in a sequence of the first, second, and third planetary gear sets PG1, PG2, and PG3 from an engine.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The second rotation element N2 is directly connected to the fifth rotation element N5 and the seventh rotation element N7 such that the first, second, and third planetary gear sets PG1, PG2, and PG3 include seven rotation shafts TM1 to TM7.

The seven rotation shafts TM1 to TM7 will be described in detail.

The first rotation shaft TM1 is directly connected to the first rotation element N1 (first sun gear S1) and is selectively connectable to the input shaft IS.

The second rotation shaft TM2 directly connects the second rotation element N2 (first planet carrier PC1) and the fifth rotation element N5 (second planet carrier PC2) with the seventh rotation element N7 (third sun gear S3).

The third rotation shaft TM3 is directly connected to the third rotation element N3 (first ring gear R1), is selectively connectable to the input shaft IS, and is selectively connectable to the transmission housing H.

The fourth rotation shaft TM4 is directly connected to the fourth rotation element N4 (second sun gear S2) and is selectively connectable to the first rotation shaft TM1.

The fifth rotation shaft TM5 is directly connected to the sixth rotation element N6 (second ring gear R2) and is directly connected to the transmission housing H.

The sixth rotation shaft TM6 is directly connected to the eighth rotation element N8 (third planet carrier PC3), is selectively connectable to the fourth rotation shaft TM4, and is directly connected to the output shaft OS.

The seventh rotation shaft TM7 is directly connected to the ninth rotation element N9 (third ring gear R3) and is selectively connectable to the first rotation shaft TM1.

In addition, five clutches C1, C2, C3, C4, and C5 that are control elements are disposed at portions at which two rotation shafts among the rotation shafts TM1 to TM7 are selectively connectable to each other, and a brake B1 that is a control element is disposed at a portion at which any one rotation shaft among the rotation shaft TM1 to TM7 is selectively connectable to the transmission housing H.

Arrangements of the six control elements C1 to C5 and B1 are described in detail.

The first clutch C1 is disposed between the input shaft IS and the first rotation shaft TM1 and selectively connects the input shaft IS with the first rotation shaft TM1.

The second clutch C2 is disposed between the input shaft IS and the third rotation shaft TM3 and selectively connects the input shaft IS with the third rotation shaft TM3.

The third clutch C3 is disposed between the fourth rotation shaft TM4 and the sixth rotation shaft TM6 and selectively connects the fourth rotation shaft TM4 with the sixth rotation shaft TM6.

The fourth clutch C4 is disposed between the first rotation shaft TM1 and the fourth rotation shaft TM4 and selectively connects the first rotation shaft TM1 with the fourth rotation shaft TM4.

The fifth clutch C5 is disposed between the first rotation shaft TM1 and the seventh rotation shaft TM7 and selectively connects the first rotation shaft TM1 with the seventh rotation shaft TM7.

The first brake B1 is disposed between the third rotation shaft TM3 and the transmission housing H and causes the third rotation shaft TM3 to be operated as a selective fixed element.

The control elements including the first, second, third, fourth, and fifth clutches C1, C2, C3, C4, and C5 and the first brake B1 may be multi-plates friction elements of wet type that are operated by hydraulic pressure.

FIG. 2 is an operation chart of control elements at each speed stage in the planetary gear train according to various embodiments of the present invention.

As shown in FIG. 2, three control elements are operated at each speed stage in the planetary gear train according to various embodiments of the present invention.

The first and fifth clutches C1 and C5 and the first brake B1 are operated at a first forward speed stage D1.

In a state that the input shaft IS is connected to the first rotation shaft TM1 by operation of the first clutch C1 and the first rotation shaft TM1 is connected to the seventh rotation shaft TM7 by operation of the fifth clutch C5, torque of the input shaft IS is input to the first rotation shaft TM1. In addition, the fifth rotation shaft TM5 is operated as the fixed element and the third rotation shaft TM3 is operated as the fixed element by operation of the first brake B1. Therefore, the torque of the input shaft IS is shifted into the first forward speed stage, and the first forward speed stage is output through the output shaft OS connected to the sixth rotation shaft TM6.

The first, third, and fifth clutches C1, C3, and C5 are operated at a second forward speed stage D2.

In a state that the input shaft IS is connected to the first rotation shaft TM1 by operation of the first clutch C1, the fourth rotation shaft TM4 is connected to the sixth rotation shaft TM6 by operation of the third clutch C3, the first rotation shaft TM1 is connected to the seventh rotation shaft TM7 by operation of the fifth clutch C5, the torque of the input shaft IS is input to the first rotation shaft TM1. In addition, the fifth rotation shaft TM5 is operated as the fixed element. Therefore, the torque of the input shaft IS is shifted into the second forward speed stage, and the second forward speed stage is output through the output shaft OS connected to the sixth rotation shaft TM6.

The first, fourth, and fifth clutches C1, C4, and C5 are operated at a third forward speed stage D3.

In a state that the input shaft IS is connected to the first rotation shaft TM1 by operation of the first clutch C1, the first rotation shaft TM1 is connected to the fourth rotation shaft TM4 by operation of the fourth clutch C4, and the first rotation shaft TM1 is connected to the seventh rotation shaft TM7 by operation of the fifth clutch C5, the torque of the input shaft IS is input to the first rotation shaft TM1. In addition, the fifth rotation shaft TM5 is operated as the fixed element. Therefore, the torque of the input shaft IS is shifted into the third forward speed stage, and the third forward speed stage is output through the output shaft OS connected to the sixth rotation shaft TM6.

The first, second, and fifth clutches C1, C2, and C5 are operated at a fourth forward speed stage D4.

In a state that the input shaft IS is connected to the first rotation shaft TM1 by operation of the first clutch C1, the input shaft IS is connected to the third rotation shaft TM3 by operation of the second clutch C2, and the first rotation shaft TM1 is connected to the seventh rotation shaft TM7 by operation of the fifth clutch C5, the torque of the input shaft IS is input to the first rotation shaft TM1 and the third rotation shaft TM3. In addition, the fifth rotation shaft TM5 is operated as the fixed element. Therefore, the torque of the input shaft IS is shifted into the fourth forward speed stage, and the fourth forward speed stage is output through the output shaft OS connected to the sixth rotation shaft TM6. At the fourth forward speed stage, the same rotation speed as the input shaft IS is output.

The second, fourth, and fifth clutches C2, C4, and C5 are operated at a fifth forward speed stage D5.

In a state that the input shaft IS is connected to the third rotation shaft TM3 by operation of the second clutch C2, the first rotation shaft TM1 is connected to the fourth rotation shaft TM4 by operation of the fourth clutch C4, and the first rotation shaft TM1 is connected to the seventh rotation shaft TM7 by operation of the fifth clutch C5, the torque of the input shaft IS is input to the third rotation shaft TM3. In addition, the fifth rotation shaft TM5 is operated as the fixed element. Therefore, the torque of the input shaft IS is shifted into the fifth forward speed stage, and the fifth forward speed stage is output through the output shaft OS connected to the sixth rotation shaft TM6.

The second, third, and fifth clutches C2, C3, and C5 are operated at a sixth forward speed stage D6.

In a state that the input shaft IS is connected to the third rotation shaft TM3 by operation of the second clutch C2, the fourth rotation shaft TM4 is connected to the sixth rotation shaft TM6 by operation of the third clutch C3, and the first rotation shaft TM1 is connected to the seventh rotation shaft TM7 by operation of the fifth clutch C5, the torque of the input shaft IS is input to the third rotation shaft TM3. In addition, the fifth rotation shaft TM5 is operated as the fixed element. Therefore, the torque of the input shaft IS is shifted into the sixth forward speed stage, and the sixth forward speed stage is output through the output shaft OS connected to the sixth rotation shaft TM6.

The second, third, and fourth clutches C2, C3, and C4 are operated at a seventh forward speed stage D7.

In a state that the input shaft IS is connected to the third rotation shaft TM3 by operation of the second clutch C2, the fourth rotation shaft TM4 is connected to the sixth rotation shaft TM6 by operation of the third clutch C3, and the first rotation shaft TM1 is connected to the fourth rotation shaft TM4 by operation of the fourth clutch C4, the torque of the input shaft IS is input to the third rotation shaft TM3. In addition, the fifth rotation shaft TM5 is operated as the fixed element. Therefore, the torque of the input shaft IS is shifted into the seventh forward speed stage, and the seventh forward speed stage is output through the output shaft OS connected to the sixth rotation shaft TM6.

The first, second, and third clutches C1, C2, and C3 are operated at an eighth forward speed stage D8. In a state that the input shaft IS is connected to the first rotation shaft TM1 by operation of the first clutch C1, the input shaft IS is connected to the third rotation shaft TM3 by operation of the second clutch C2, and the fourth rotation shaft TM4 is connected to the sixth rotation shaft TM6 by operation of the third clutch C3, the torque of the input shaft IS is input to the first rotation shaft TM1 and the third rotation shaft TM3. In addition, the fifth rotation shaft TM5 is operated as the fixed element. Therefore, the torque of the input shaft IS is shifted into the eighth forward speed stage, and the eighth forward speed stage is output through the output shaft OS connected to the sixth rotation shaft TM6.

The first and third clutches C1 and C3 and the first brake B1 are operated at a reverse speed stage REV.

In a state that the input shaft IS is connected to the first rotation shaft TM1 by operation of the first clutch C1 and the fourth rotation shaft TM4 is connected to the sixth rotation shaft TM6 by operation of the third clutch C3, the torque of the input shaft IS is input to the first rotation shaft TM1. In addition, the fifth rotation shaft TM5 is operated as the fixed element and the third rotation shaft TM3 is operated as the fixed element by operation of the first brake B1. Therefore, the torque of the input shaft IS is shifted into the reverse speed stage, and the reverse speed stage is output through the output shaft OS connected to the sixth rotation shaft TM6.

The planetary gear train according to various embodiments of the present invention achieves at least eight forward speed stages and one reverse speed stage by combining three planetary gear sets PG1, PG2, and PG3 with five clutches C1, C2, C3, C4, and C5 and one brake B1.

In addition, the planetary gear train according to various embodiments of the present invention improves silent driving because speed stages suitable to a rotational speed of the engine are achieved due to multiple-speed stages of the automatic transmission.

In addition, the planetary gear train according to various embodiments of the present invention maximizes driving efficiency of the engine and may improve power delivery performance and fuel consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving torque of an engine;
    an output shaft outputting the torque of the engine or changed torque of the engine;

a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a first rotation shaft directly connected to the first rotation element and selectively connectable to the input shaft;
a second rotation shaft directly connecting the second rotation element with the fifth rotation element and the seventh rotation element;
a third rotation shaft directly connected to the third rotation element and selectively connectable to at least one of the input shaft and a transmission housing;
a fourth rotation shaft directly connected to the fourth rotation element and selectively connectable to the first rotation shaft;
a fifth rotation shaft directly connected to the sixth rotation element and directly connected to the transmission housing;
a sixth rotation shaft directly connected to the eighth rotation element, selectively connectable to the fourth rotation shaft, and directly connected to the output shaft; and
a seventh rotation shaft directly connected to the ninth rotation element and selectively connectable to the first rotation shaft.

2. The planetary gear train of claim 1, wherein the first planetary gear set comprises a single pinion planetary gear set, the first rotation element is a first sun gear, the second rotation element is a first planet carrier, and the third rotation element is a first ring gear,
the second planetary gear set comprises a single pinion planetary gear set, the fourth rotation element is a second sun gear, the fifth rotation element is a second planet carrier, and the sixth rotation element is a second ring gear, and
the third planetary gear set comprises a single pinion planetary gear set, the seventh rotation element is a third sun gear, the eighth rotation element is a third planet carrier, and the ninth rotation element is a third ring gear.

3. A planetary gear train of an automatic transmission for a vehicle, comprising:
an input shaft receiving torque of an engine;
an output shaft outputting the torque of the engine or changed torque of the engine;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a first rotation shaft directly connected to the first rotation element and selectively connectable to the input shaft;
a second rotation shaft directly connecting the second rotation element with the fifth rotation element and the seventh rotation element;
a third rotation shaft directly connected to the third rotation element and selectively connectable to at least one of the input shaft and a transmission housing;
a fourth rotation shaft directly connected to the fourth rotation element and selectively connectable to the first rotation shaft;
a fifth rotation shaft directly connected to the sixth rotation element and directly connected to the transmission housing;
a sixth rotation shaft directly connected to the eighth rotation element, selectively connectable to the fourth rotation shaft, and directly connected to the output shaft;
a seventh rotation shaft directly connected to the ninth rotation element and selectively connectable to the first rotation shaft;
a first clutch selectively connecting the input shaft with the first rotation shaft;
a second clutch selectively connecting the input shaft with the third rotation shaft;
a third clutch selectively connecting the fourth rotation shaft with the sixth rotation shaft;
a fourth clutch selectively connecting the first rotation shaft with the fourth rotation shaft;
a fifth clutch selectively connecting the first rotation shaft with the seventh rotation shaft; and
a first brake selectively connecting the third rotation shaft with the transmission housing.

4. The planetary gear train of claim 3, wherein the first planetary gear set comprises a single pinion planetary gear set, the first rotation element is a first sun gear, the second rotation element is a first planet carrier, and the third rotation element is a first ring gear,
the second planetary gear set comprises a single pinion planetary gear set, the fourth rotation element is a second sun gear, the fifth rotation element is a second planet carrier, and the sixth rotation element is a second ring gear, and
the third planetary gear set comprises a single pinion planetary gear set, the seventh rotation element is a third sun gear, the eighth rotation element is a third planet carrier, and the ninth rotation element is a third ring gear.

5. The planetary gear train of claim 3, wherein a first forward speed stage is achieved by operation of the first and fifth clutches and the first brake,
a second forward speed stage is achieved by operation of the first, third, and fifth clutches,
a third forward speed stage is achieved by operation of the first, fourth, and fifth clutches,
a fourth forward speed stage is achieved by operation of the first, second, and fifth clutches,
a fifth forward speed stage is achieved by operation of the second, fourth, and fifth clutches,
a sixth forward speed stage is achieved by operation of the second, third, and fifth clutches,
a seventh forward speed stage is achieved by operation of the second, third, and fourth clutches,
an eighth forward speed stage is achieved by operation of the first, second, and third clutches, and
a reverse speed stage is achieved by operation of the first and third clutches and the first brake.

6. A planetary gear train of an automatic transmission for a vehicle, comprising:
an input shaft receiving torque of an engine;
an output shaft outputting the torque of the engine or changed torque;

a first planetary gear set comprising a single pinion planetary gear set including a first sun gear, a first planet carrier, and a first ring gear as rotation elements thereof;

a second planetary gear set comprising a single pinion planetary gear set including a second sun gear, a second planet carrier, and a second ring gear as rotation elements thereof; and a third planetary gear set comprising a single pinion planetary gear set including a third sun gear, a third planet carrier, and a third ring gear as rotation elements thereof, wherein the first sun gear is selectively connectable to at least one of the input shaft, the second sun gear, and the third ring gear, the first planet carrier is directly connected to the second planet carrier and the third sun gear, the first ring gear is selectively connectable to at least one of the input shaft and a transmission housing, the second sun gear is selectively connectable to the third planet carrier, the second ring gear is directly connected to the transmission housing, and the third planet carrier is directly connected to the output shaft.

7. The planetary gear train of claim 6, further comprising:

a first clutch selectively connecting the input shaft with the first sun gear;

a second clutch selectively connecting the input shaft with the first ring gear;

a third clutch selectively connecting the second sun gear with the third planet carrier;

a fourth clutch selectively connecting the first sun gear with the second sun gear;

a fifth clutch selectively connecting the first sun gear with the third sun gear; and a first brake selectively connecting the first ring gear with the transmission housing.

8. The planetary gear train of claim 7, wherein a first forward speed stage is achieved by operation of the first and fifth clutches and the first brake, a second forward speed stage is achieved by operation of the first, third, and fifth clutches, a third forward speed stage is achieved by operation of the first, fourth, and fifth clutches, a fourth forward speed stage is achieved by operation of the first, second, and fifth clutches, a fifth forward speed stage is achieved by operation of the second, fourth, and fifth clutches, a sixth forward speed stage is achieved by operation of the second, third, and fifth clutches, a seventh forward speed stage is achieved by operation of the second, third, and fourth clutches, an eighth forward speed stage is achieved by operation of the first, second, and third clutches, and a reverse speed stage is achieved by operation of the first and third clutches and the first brake.

\* \* \* \* \*